J. B. STRAUSS.
PASSENGER CARRYING DEVICE.
APPLICATION FILED JULY 27, 1912.
1,235,506.
Patented July 31, 1917.
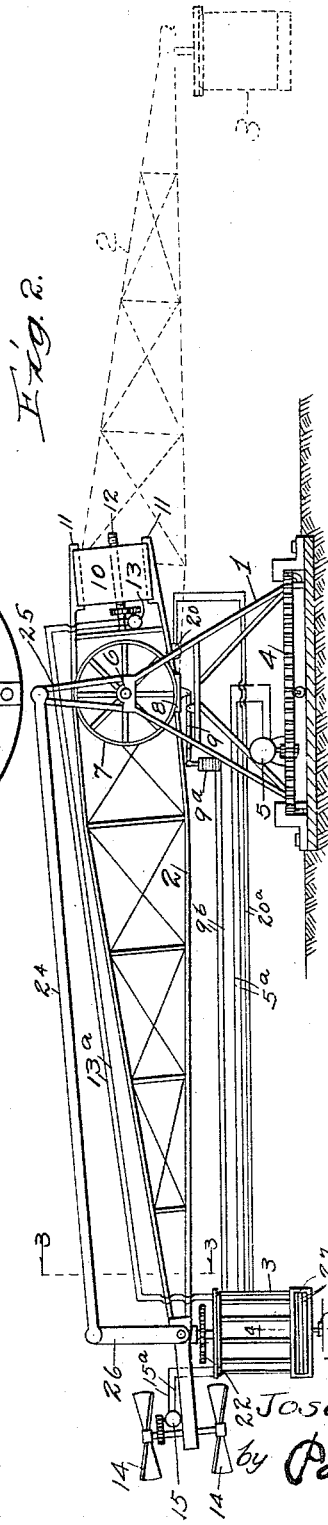

UNITED STATES PATENT OFFICE.

JOSEPH B. STRAUSS, OF CHICAGO, ILLINOIS.

PASSENGER-CARRYING DEVICE.

1,235,506.  Specification of Letters Patent.  Patented July 31, 1917.

Application filed July 27, 1912. Serial No. 711,930.

*To all whom it may concern:*

Be it known that I, JOSEPH B. STRAUSS, a citizen of the United States, residing at Chicago, in the county of Cook and State of Illinois, have invented a certain new and useful Improvement in Passenger-Carrying Devices, of which the following is a specification.

This invention relates to improvements in passenger carrying devices and has for its object to provide a new and improved device of this description, particularly adapted for amusement purposes.

The invention is illustrated in the accompanying drawings wherein—

Figure 1 is a plan view of one form of device embodying the invention.

Fig. 2 is a side elevation of the device shown in Fig. 1.

Fig. 3 is a sectional view taken on line 3—3 of Fig. 2 with parts omitted.

Fig. 4 is a sectional view taken on line 4—4 of Fig. 2.

Fig. 5 is a bottom view of the car.

Like numerals refer to like parts throughout the several figures.

In carrying out my invention, I provide a suitable support 1 upon which is rotatably mounted an arm 2 carrying out on its outer end a device or car 3 for passengers. The support 1 is preferably arranged so that it may be rotated. This may be done in any desired manner as by means of a circular rack 4 and a motor 5. The arm 2 is preferably carried by a shaft 6 which is mounted upon the support 1. This shaft is preferably provided with a brake wheel 7 having associated therewith a brake shoe 8 controlled by a lever 9 arranged so that the arm may be held in any desired position. The arm 2 is provided with a counterweight 10 preferably adjustably connected therewith. As herein shown, the counterweight is movable with relation to the arm and is carried by the guides 11, the counterweight being moved by means of a screw 12 working in a screw-threaded opening and actuated by a motor 13. This motor may be controlled by the operator on the car by means of the electrical conductors 13$^a$. By moving the counterweight 10 in or out, the arm may be properly balanced when the number of passengers in the car varies. The arm 2 is adapted to be moved about its point of support on the support 1. As the device is properly balanced by means of the counterweight, very little force will be required to move it. This movement may be produced by means of one or more rotating air propellers or fans 14 located at the outer end of the arm and adapted to rotate about an axis substantially perpendicular to said arm. As herein illustrated, I have shown two rotary propellers, one above and the other below the arm. The fans or propellers may be actuated in any desired manner as by means of a motor 15 mounted on the arm 2 and operatively connected with the shaft to the fan. This motor may be controlled by the operator on the car by means of the electrical conductors 15$^a$. It will be seen that when the propeller wheels are operated they will act upon the air and move the arm about its axis of rotation. The device may be provided with an auxiliary actuating mechanism to be used in case the propellers for any reason fail to act. This auxiliary actuating mechanism may consist of a gear wheel 19 connected with the arm 2, said gear wheel being operated by means of a motor 20 mounted on the support 1. This motor is controlled by the operator on the car by means of the electrical conductors 20$^a$. The apparatus is controlled by an operator on the car, said operator controlling the various motors from his position thereon. The car 3 is pivotally suspended from the side pieces 16 of the arm 2 by means of a shaft 17 movably mounted on the side pieces 16. This car is also rotatable about its axis and is rotated by means of a motor 18, which as shown is mounted on the car and which has a pinion 21 which engages a gear 22 connected with a supporting piece 23 fixed against rotation but upon which the car is rotatably carried. I prefer to provide some suitable means to keep the car always in a vertical position. One means for this purpose as herein shown, consists of two arms 24. These arms are pivotally connected at one end to the fixed parts 25 attached to the support and at the other end to the upstanding parts 26 connected with the car, in this instance, through the shaft 17. The arm 2 may be termed the main arm and the arms 24 the secondary arms. It will be seen that as the arm turns over, the parts 25 and 26 are maintained in parallel relation, the arms 24 always remaining parallel to the axis of the arm 2, thereby maintaining the car 3 in an upright position at all times. I prefer to have the brake shoe 8 controlled by a magnet or solenoid 9ᵃ controlled from the car 3 by means of conductors 9ᵇ. When the magnet or solenoid is energized, the brake will be set and when deënergized, the brake will be released by its own weight. I also prefer to provide the car with a series of removable weights 27 which may be removed or attached to the cars for the purpose of balancing it as the number of passengers varies. These weights may be attached to the car in any desired manner, as for example, by being slid into a compartment at the bottom thereof, said weights being slotted to pass the holding piece 28, as shown by dotted lines in Fig. 5. When inserted in this manner the weights may be provided with eyes for handling them, as also shown in Fig. 5. These balancing weights may be used alone to balance the car, or the counterweight 10 may be used alone, or the two means may be used conjointly. I also prefer to provide means for balancing the arm before the arm 2 is set in motion. For this purpose, I provide a holding piece 28 which may be fastened to a fixed part 29 below the car and which extends through a slot 30 in the bottom of the car. This holding piece 28 is provided with projections 31 and 32 located on opposite sides at the bottom of the car. The holding piece 28 is rotatable so that it may be moved to permit the projections 31 and 32 to pass through the slot 30 and may then be given a half turn so that the car will be locked against movement up and down except a small movement between the projections 31 and 32. When the car is down, the holding piece is placed in position as shown in Fig. 4 and when the number of passengers who are to be carried have entered the car, the operator balances the arm 2 by means of the counterweight 10 or the weights 27 until the bottom of the car is at a point intermediate the projections 31 and 32. The holding piece may then be turned so that the projections will pass through the slot 30 and the car then started. The projection 31 acts as a safety device and prevents the movement of the arm while it is being balanced. If some safety device is not used, the operator might move the counterweight too far out and thus cause the arm to be moved at too great a speed by the counterweight and before he is ready to make the trip. The motor 5 which rotates the support 1 may be controlled by the operator in the car by means of the electrical conductors 5ᵃ. These various conductors for controlling the several motors are flexible so as to permit the proper movement of the arm and the other parts are here simply shown diagrammatically.

In using the device, a desired number of passengers are placed in the car and the propeller wheels set in motion. The arm 2 is then moved up in a vertical plane until it reaches a vertical position and is then moved down on the other side to the position shown in dotted lines in Fig. 2. The car 3 being pivoted, passes between the side pieces 16 and maintains an upright position at all times. While the arm is being moved as above set out, the car itself may be rotated by means of motor 18 about its axis. The support 1 may also be rotated, thus giving a varied and complexed movement to the passengers in the car. Before the car is started, the counterweight 10 is moved in or out to adjust it to properly balance the arm to correspond with the number of passengers in the car.

It will be noted that the counterweight for the car or carrying device is located at the bottom of the carrying device and that the stress upon the secondary arms 24 is relieved by this counterweight.

I claim:

1. The combination with a support of an arm mounted upon said support so as to rotate in a vertical plane, a carrying device connected with the outer end of said arm and means for moving said arm so as to carry the carrying device from one side of the support to the other, separate counterweights for the arm and for the carrying device.

2. The combination with a support of an arm mounted upon said support so as to rotate in a vertical plane, a carrying device connected with the outer end of said arm and means for moving said arm so as to carry the carrying device from one side of the support to the other, separate counterweights for the arm and for the carrying device and means for independently varying the balancing effect of the counterweights as the number of passengers in the carrying device varies.

3. The combination with a support of an arm mounted upon said support so as to rotate in a vertical plane from one side of the support to the other, a carrying device connected with the outer end of said arm, an air propeller connected with the outer end of said arm and means for rotating said air propeller so as to move the arm about its point of support.

4. The combination with a support of an arm rotatably mounted thereon, so as to travel in a vertical plane from one side of said support to the other side thereof, a carrying device connected with said arm at a distance from said support, an air propeller connected with one end of said arm and an adjustable counterweight device connected with the other end of said arm and means for actuating the propeller to move the arm around its point of support.

5. The combination with a support of an arm rotatably mounted thereon, a carrying device connected with said arm at a distance from said support, an air propeller connected with one end of said arm and an adjustable counterweight device connected with the other end of said arm and means for actuating the propeller to move the carrying device from one side of said support to the other side thereof in a vertical plane and a device for simultaneously rotating said support.

6. The combination with a support of an arm pivotally mounted thereon, a carrying device rotatably connected with said arm, an air propelling device attached to said arm and adapted when rotated to move the arm about its pivotal point and means for simultaneously rotating said support about different axes and carrying device.

7. The combination with a support of an arm movably connected therewith so as to be free to move in a vertical plane, a carrying device movably connected with the outer end of said arm, means for moving said arm about its point of support, two counterweights, one on the arm and the other on the car and a secondary connection between the car and the support.

8. The combination with a support, of an arm movably connected therewith so as to be free to move in a vertical plane, a carrying device pivotally connected with the outer end of said arm, an adjustable counterweight connected with said carrying device, means for moving the arm with relation to said support, and a connection between the support and the carrying device, for keeping said carrying device in a vertical position during all the positions of the arm.

9. The combination with a support, of an arm movably connected therewith and adapted to be moved in a vertical plane, a carrying device connected with said arm, means for moving said arm, a holding piece for connecting said carrying device with a fixed part, limiting devices associated with the holding piece for limiting the up and down movement of said carrying device, and means for counterbalancing said arm as the number of passengers in the car varies and while said car is connected with the fixed part.

10. The combination with a support of an arm movably connected therewith, a motor for moving said support, a motor for moving said arm, a car connected with said arm, a counterweight connected with said arm, a motor for moving said weight and means on the car for controlling all of said motors.

11. The combination with a support of a main arm movably connected therewith, a carrying device connected with said arm, a secondary arm associated with said main arm, a counterweight connected with said carrying device near the bottom thereof and a counterweight connected with said main arm, said counterweight connected with the carrying device relieving the stress upon the secondary arm.

12. The combination with a support of a main arm pivotally mounted thereon and adapted to move in a vertical plane, a carrying device rotatably connected with said arm so as to be free to rotate about a vertical axis, auxiliary arms connecting said support and said carrying device and arranged to keep said car in a vertical position while it is moving through its path of travel and means for rotating said carrying device about its vertical axis.

In testimony whereof, I affix my signature in the presence of two witnesses this 22d day of July, 1912.

JOSEPH B. STRAUSS.

Witnesses:
 GENEVA HIRTH,
 DENIS A. WALTER.

Copies of this patent may be obtained for five cents each, by addressing the "Commissioner of Patents, Washington, D. C."